United States Patent
Gutting

[15] 3,700,996
[45] Oct. 24, 1972

[54] REMOTE THROTTLE CONTROL VIA STEP MOTOR MOVEMENT AND RESPONSIVE TO VEHICLE OR ENGINE CONDITION

[72] Inventor: James I. Gutting, Flint, Mich.
[73] Assignee: General Motors Corporation, Detroit, Mich.
[22] Filed: Sept. 24, 1971
[21] Appl. No.: 183,552

[52] U.S. Cl. ................... 318/696, 290/40, 123/102
[51] Int. Cl. ............................................ H02k 37/00
[58] Field of Search ........ 180/65; 290/40.2; 123/102; 318/696, 685, 138

[56] References Cited

UNITED STATES PATENTS

| | | | |
|---|---|---|---|
| 3,355,644 | 11/1967 | Goslin et al. | 318/696 |
| 3,485,316 | 12/1969 | Slavin et al. | 123/102 |
| 3,511,329 | 5/1970 | Wisner et al. | 123/102 |
| 3,319,733 | 5/1967 | Rath et al. | 123/102 |

*Primary Examiner*—G. R. Simmons
*Attorney*—J. L. Carpenter et al.

[57] ABSTRACT

Apparatus for controlling the operation of a vehicle by manipulating the vehicle's throttle. A stepping motor manipulates the throttle in response to differences between a reference signal indicative of a selected operating condition of the vehicle and a feedback signal indicative of the corresponding actual operating condition of the vehicle. Either the vehicle engine speed, the torque generated by the vehicle engine at the driven wheels, or the vehicle speed is controlled by the apparatus. It also allows increasing any of these conditions at a uniform rate up to a predetermined maximum. If any of these conditions actually exceed certain maximums, the throttle is automatically returned to its normal setting, which may also be effected by the operator closing a certain switch.

2 Claims, 1 Drawing Figure

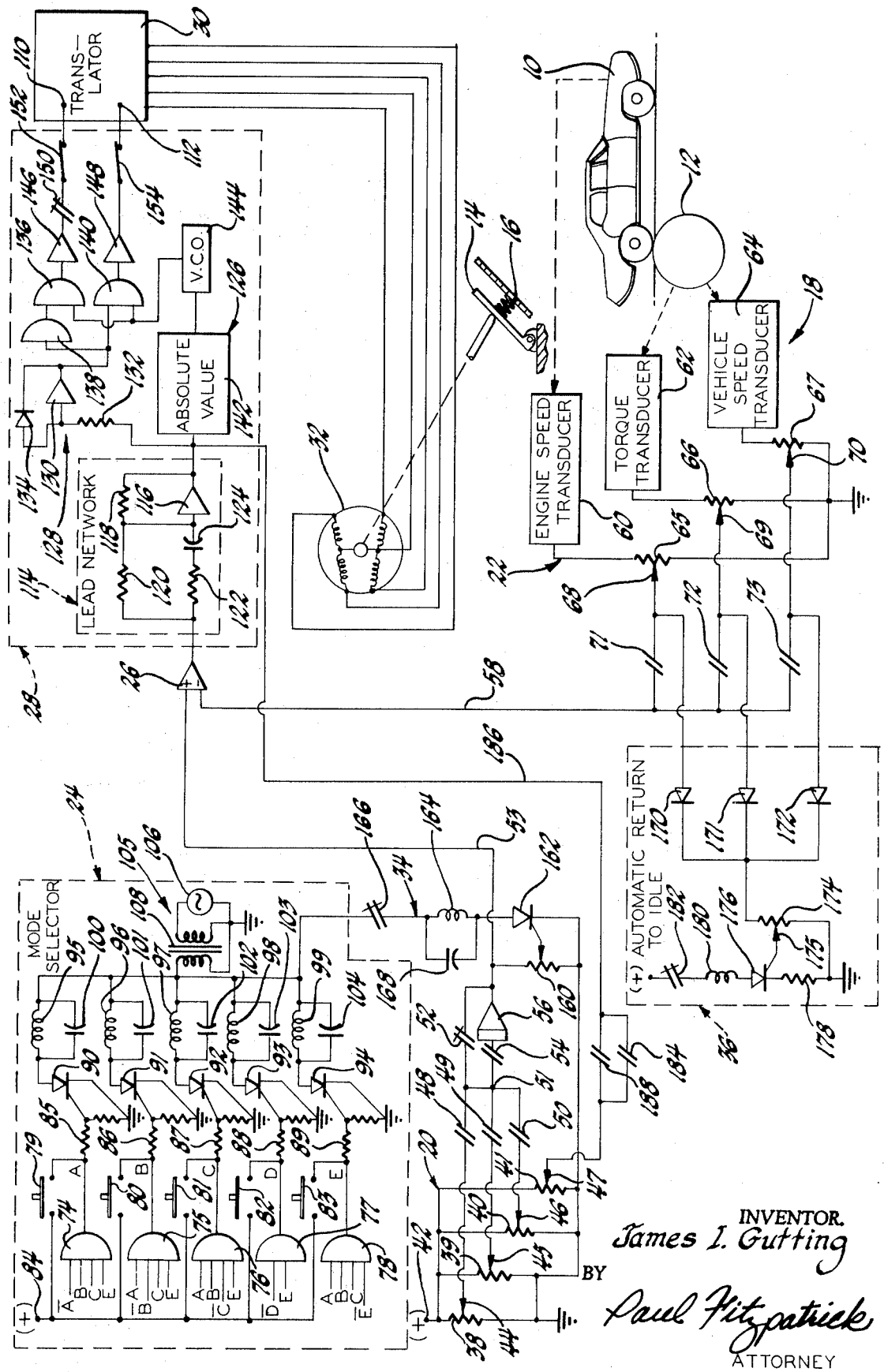

REMOTE THROTTLE CONTROL VIA STEP MOTOR MOVEMENT AND RESPONSIVE TO VEHICLE OR ENGINE CONDITION

This invention relates to apparatus for controlling an operating condition of a vehicle and, more particularly, to apparatus employed to control a selected one of several vehicle operating conditions within predetermined limits while the vehicle is undergoing various tests.

In the field of vehicle testing it is often desirable to accurately control the engine speed of a vehicle, the torque developed by the vehicle engine, or the vehicle speed within certain prescribed limits over extended periods of time. Since it is extremely difficult for a vehicle driver to maintain any of these vehicle operating conditions within prescribed limits for an extended period, many proposals have heretofore been made for employing apparatus which maintains a predetermined vehicle operating condition within prescribed limits by manipulation of the vehicle throttle in response to electrical signals. However, it is exceedingly difficult to devise a servomechanism capable of performing this task as there is a substantial time delay between the time a vehicle throttle setting is changed and the time at which a corresponding change in a vehicle condition being controlled actually occurs. As a result of this time delay a system which contains sufficient amplification to continuously maintain a vehicle operating condition very close to a constant value may also contain sufficient amplification for the system to become unstable, i.e., to oscillate, when a change in the operating condition is required. For example, a servomechanism which manipulates a vehicle throttle so as to maintain the engine speed of the vehicle constant within a few revolutions per minute may contain so much amplification as to cause oscillation when it is used to instantaneously increase the vehicle engine speed by a few thousand rpm's, particularly when the vehicle engine is substantially unloaded, as when it is not connected through a transmission to the driving wheels of the vehicle. Conditions such as the foregoing have often arisen when a DC motor has been employed to maintain the vehicle throttle partially depressed against a biasing force, which is usually generated by throttle return spring. Accordingly, various apparatus have also employed AC motors to manipulate a vehicle throttle in order that a vehicle operating condition may be controlled. However, in many instances it is desired to control one of these operating conditions while evaluating noise within the vehicle. Since an AC motor is inherently more susceptible to the generation of unwanted noise, these systems have similarly contained inherent disadvantages.

It is therefore an object of this invention to provide apparatus for controlling an operating condition of a vehicle by manipulation of the vehicle throttle, the throttle manipulation being effected by a stepping motor in response to an analog reference signal that is indicative of a desired vehicle operating condition and an analog feedback signal that is indicative of the actual vehicle operating condition.

It is another object of this invention to provide apparatus for controlling a selected one of several vehicle operating conditions by manipulation of the vehicle throttle, the throttle manipulation being effected by a stepping motor in response to the difference between any of several preselected analog reference signals and corresponding feedback signals, provision also being made for increasing the selected operating condition to a predetermined maximum at a uniform rate.

It is also an object of this invention to provide apparatus which controls a predetermined vehicle operating condition within prescribed limits by manipulation of the vehicle throttle, which increases the prescribed vehicle condition at a uniform rate to a predetermined maximum level, and which automatically returns the vehicle throttle to a certain throttle setting when any of several operating conditions exceeds a predetermined level.

The foregoing and other objects and advantages of the subject invention will become apparent from the following description and accompanying drawing, which is a schematic diagram of a preferred embodiment of the subject invention.

In the drawing a rear wheel drive vehicle 10 is shown having its driven wheels mounted on a set of dynamometer rolls 12, as is customary in laboratory testing of vehicles. Accordingly, when the vehicle 10 is securely held in position and is in operation the rear wheels of the vehicle 10 cause the dynamometer rolls 12 to rotate at a speed which is indicative of the speed of the vehicle if the vehicle 10 were actually moving and the torque generated by the vehicle 10 engine and drivetrain at the rear wheels at any given time is proportional to the force causing the dynamometer rolls 12 to rotate. To increase the vehicle 10 speed the operator increases the setting of the vehicle throttle, which is illustrated as an accelerator pedal 14 of a well known configuration. The throttle 14, which is illustrated separate from the vehicle 10 for descriptive purposes, is normally held in a certain throttle setting by a bias spring 16, also in a well known manner. The remainder of the illustrated apparatus constitutes a throttle control system 18 which manipulates the throttle 14 so as to control either the vehicle 10 engine speed, vehicle 10 speed as represented by rotational speed of the dynamometer rolls 12, or engine torque as represented by torque rotating the dynamometer rolls 12, within prescribed limits.

The throttle control system 18 includes a reference signal generating network 20 for generating several reference signals each of which is indicative of a desired engine operating condition. The system 18 also includes a feedback signal generating network that is responsive to the engine speed, torque developed, and vehicle speed of the vehicle 10. The feedback signal generating network 22 generates a feedback signal that is actually indicative of each of these operating conditions. A logic network 24 is provided in the system 18 for selecting which of these operating conditions will be controlled and for applying the reference and feedback signals corresponding to this preselected condition to the input terminals of differential amplifier 26, which generates an error signal on its output terminal that is indicative of the difference between the desired vehicle operating condition and the actual vehicle operating condition. The error signal from the differential amplifier 26 is an analog signal that is applied to a signal conditioning network 28, which generates first and second digital signals and applies these signals to a translator 30 that controls the operation of a stepping motor 32.

The stepping motor 32 armature is drivably coupled as illustrated to the throttle 14 so as to depress the throttle 14 and effect a predetermined increase in the throttle 14 setting when the stepping motor receives a first control signal from the translator 30. Upon receipt of a second control signal from the translator 30 the stepping motor 32 releases the throttle 14 a predetermined amount. The system 18 also includes a limit detector network 34 for limiting the magnitude of the preselected reference signal generated by the reference signal generating network 20 and an automatic throttle release network 36 for automatically causing the stepping motor 32 to release the throttle 14 when any of the feedback signals generated by the feedback signal generating network 22 exceed a predetermined value.

Each section of the system 18 will now be explained in detail.

The reference signal generating network 20 includes several potentiometers 38 through 41 that are connected in parallel between a terminal 42 that is held at a positive voltage and ground. The wipers 44 through 46 of the potentiometers 38 through 40 are each connected through a set of normally open contacts 48 through 50 to a junction 51. The contacts 48 through 50 are controlled by the logic network 24 so that only one set of contacts 48 through 50 may be closed at any time, as will be subsequently described. In the illustrated embodiment the respective voltages at the wipers 44 through 46 are respectively indicative of a desired vehicle engine speed, engine torque, and vehicle speed so that when one set of contacts 48 through 50 is closed the preselected reference signal appears at the junction 51 and is applied through a set of normally closed contacts 52 to a lead 53, through which the preselected reference signal is applied to the differential amplifier 26. The normally closed contacts 52 are operated simultaneously, with a set of normally open contacts 54 by the logic network 24 when the operator wishes to increase the preselected reference signal on the lead 53 at a uniform and predetermined rate. This preference is effected upon closure of the contacts 54 by applying the junction 51 voltage to the input terminal of an integrator 56 having its output terminal connected to the lead 53. When the corresponding potentiometer wiper 44, 45, or 46 is held at a constant voltage the integrator 56 output voltage, which is then the preselected reference signal on the lead 53, increases linearly. When this signal is applied to the first input of the differential amplifier 26 it is compared with a feedback signal that corresponds to the preselected reference signal, is indicative of the actual preselected operating condition, i.e. engine speed, engine torque, or vehicle speed, of the vehicle 10, is generated by the feedback signal generating network 22, and is applied by the feedback signal generating network 22 to the other input of the differential amplifier 26, which is an inverting input, through a lead 58.

The feedback signal generating network 22 generates three feedback signals indicative of the actual engine speed of the vehicle 10, the torque developed by the vehicle 10 engine at the dynamometer rolls 12, and the speed of the vehicle 10 as determined by the speed of the dynamometer rolls 12. These respective signals are developed by a frequency-to-DC converter 60, which is sometimes called a frequency meter and is coupled to the vehicle 10 ignition system, a torque transducer 62, which is sometimes called a load cell, that is coupled to the dynamometer rolls 12, and a tachometer generator 64 that is also coupled to the dynamometer rolls 12. Several potentiometers 65 through 67 are connected to receive the signals generated by the frequency meter 60, the load cell 62, and the tachometer generator 64. The wipers 68 through 70 of the respective potentiometers 65 through 67 are each connected by a set of normally open contacts 71 through 73 to the lead 58. The contacts 71 through 73 are controlled by the logic network 24 simultaneously with the respective contacts 48 through 50 in the reference signal generating network 20 for applying a preselected feedback signal to the lead 58 when the throttle control system 18 operator elects to control a certain vehicle 10 operating condition.

The main function of the logic network 24 is to determine which of the reference signals and feedback signals are applied to the differential amplifier 26, as previously mentioned. The logic network 24 includes several NOR gates 74 through 78 that are interconnected in a manner to assure that only one reference signal and the corresponding feedback signal is applied to the differential amplifier 26 at a particular time. The operator of the system 18 makes this determination by momentarily closing one of several pushbutton switches 79 through 83 so as to apply a positive voltage from a terminal 84, which is maintained at a certain positive voltage, to the output terminal A, B, C, D, or E of the respective NOR gates 74 through 78.

A NOR gate, with which persons versed in the are are familiar, is a logic device which generates a binary output signal only when all input signals are absent. For example, when the input and output voltages of a NOR gate are either zero or a certain positive potential, as is the case in the logic network 24, the NOR gate generates the positive voltage on its output terminal only when each of its input terminals are at zero volts and at all other times its output terminal is at zero volts. Using well known binary designations, it may be said that the NOR gate output signal is one bit or "1" bit, when all of its input signals are zero bits, or "0" bit.

In the logic network 24 the output terminals A through E of the NOR gates 74 through 78 are connected to the various input terminals of the NOR gates 74 through 78 in the fashion designated in the drawing to take advantage of this characteristic of NOR gates. While the actual connections between the output terminals A through E and the input terminals of the NOR gates 74 through 78 are not illustrated in the drawing these connections are designated by corresponding letters at each of the NOR gate input terminals. For example, the input signals to the NOR gate 74 include the signals on the output terminals B, C, and E and also a binary inversion of the signal on the output terminal A. That is, the output terminal A is connected through a logical inverter to an input terminal designated $\bar{A}$ of the NOR gate 74 so that when the signal on the output terminal A is a one bit a zero bit is applied to the input terminal designated $\bar{A}$ of the NOR gate 74. Logical inversions of this type are familiar to those versed in the art so are not illustrated. By way of example, and without limitation, a NOR gate having single input and output terminals used to effect the inversion since its output is a 0 bit with a 1 bit input and vice versa. In similar fashion, the output terminals B through E are connected through logical inverters to corresponding input terminals B̄, C̄, D̄, and Ē of the NOR gates 75 through 78.

The output terminals A through E of the NOR gates 74 through 78 are connected to voltage dividers 85 through 89 which each are connected at a midpoint to the gate electrode of a silicon controlled rectifier (SCR) 90 through 94. The SCR's 90 through 94 are each connected in series with an AC relay 95 through 99. The AC relays 95 through 99 are each connected in parallel with a capacitor 100 through 104 to prevent chatter in the corresponding relay contacts and are driven by an AC voltage supply 105. The AC voltage supply 105 in the illustrated embodiment is comprised of an AC generator 106, which may by way of example be common household 120 volt power mains, and a step-down transformer 108 for developing an AC voltage compatible with the AC relays 95 through 99, which in a preferred embodiment operate at 28 volts AC. Accordingly, when one of the pushbutton switches 79 through 83 is momentarily closed the 1 bit signal which it applies to the corresponding output terminal A through E causes one of the SCR's 90 through 94 to become conductive so as to energize the corresponding relay 95 through 99, as will subsequently be described in a detailed operational description of the system 18.

The signal conditioning network 28 receives the error signal that is generated by the differential amplifier 26 in response to differences between the selected reference and feedback signals and applies the first and second digital signals to the first and second input terminals 110 and 112 of the translator 30. For each digital pulse the translator 30 receives on the first input terminal 110 a corresponding control signal is applied by the translator 30 to the stepping motor 32 so as to rotate the stepping motor 32 a predetermined angle and increase the setting of the throttle 14 by a predetermined amount. Conversely, when a pulse is applied to the second input terminal 112 of the translator 30 a different control signal is applied to the stepping motor 32, causing it to rotate in the opposite direction through the predetermined angle so as to decrease the throttle 14 setting by the predetermined amount. While various devices may be employed as the translator 30 and stepping motor 32, in a preferred embodiment of the invention they are devices manufactured by the Superior Electronic Company of Bristol, Connecticut under the respective model numbers ST250B and SS50–1009. The precise nature of the control signals applied by the translator 30 to the stepping motor 32 is not critical to this invention. It therefore suffices to state that when one of these control signals is generated the stepping motor 32 rotates the predetermined angle, which is approximately five degrees, to change the throttle 14 setting as just described. When neither of these particular control signals is generated by the translator 30 the motor 32 is merely energized by the translator 30 in an amount sufficient to hold the throttle 14 setting constant against the biasing force of the spring 16. When the error signal from the differential amplifier 26 enters the signal conditioning network 28 it first passes through a lead network 114 which amplifies the error signal by an amplification factor that increases as the rate of change in the error signal changes. That is, when the error signal changes slowly the amplification of the error signal is less than when the error signal is rapidly changing. The lead network 114 includes an operational amplifier 116 having a feedback resistor 118. The error signal is applied to the input terminal of the operational amplifier 116 through a first input resistor 120 and a second input resistor 122 that is in series with a capacitor 124. Accordingly, when the error signal changes slowly the amplification of the lead network 114 is substantially equal to the quotient of the feedback resistor 118 resistance divided by the resistance of the resistor 120. However, when the error signal changes rapidly current passes through the resistor 122 and the capacitor 124 so as to effectively decrease the input impedance to the operational amplifier. Since the amplification of the lead network 114 is equal to the feedback impedance of the operation amplifier 116 divided by its input impedance, the amplification factor of the lead network 114 is increased commensurate with the rate at which the error signal changes.

The amplified error signal from the lead network 114 is applied to absolute value detector apparatus 126 for detecting the magnitude of the error signal and a zero detector 128 for detecting whether the error signal is positive or negative. In the illustrated embodiment the error signal from the differential amplifier 26 is positive when the selected reference signal exceeds the selected feedback signal, indicating the throttle 14 setting should be increased. The error signal is negative when this condition is reversed. The lead network 114 amplifies the error signal by a negative amplification factor so when a negative amplified error signal is applied to the zero detector 128 an increase in the throttle 14 setting is required. Similarly, a positive amplified error signal indicates a decrease in the throttle 14 setting is required.

The zero detector 128 includes an inverting operational amplifier 130 having a negative amplification factor, an input resistor 132, and a feedback impedance in the form of a diode 134. Accordingly, when the amplified error signal from the lead network 114 is positive, as when the selected feedback signal exceeds the selected reference signal, current can readily pass through the diode 134 and the effective feedback impedance is very small. Since the amplification factor of the zero detector 128 is equal to the operational amplifier 130 feedback impedance divided by its input impedance the amplification factor of the zero detector 128 is very small when the amplified error signal is positive. This output signal, which is so small as to be deemed an 0 bit, is applied to an input terminal of a first NOR gate 136 through an inverting NOR gate 138 and to an input terminal of a second NOR gate 140. Accordingly, when the amplified error signal is positive the lead network 128 applies a zero bit to the second NOR gate 140 and causes a one bit to be applied to an input of the first NOR gate 136.

When the amplified error signal is negative, as when the selected reference signal exceeds the selected feedback signal the effective impedance of the diode 134 in the zero detector 128 is extremely large. The amplification factor of the zero detector 128 is thus increased significantly and the output signal that it generates becomes equal to its supply voltage, or a one bit. Accordingly, an amplified error signal causes the zero detector 128 to apply a one bit to the second NOR gate 140 and causes application of a zero bit to the first NOR gate 136 through the NOR gate 138.

The first and second NOR gates 136 and 140 also receive zero bit or one bit signals on their other input terminals from the absolute value detector apparatus 126. The absolute value detector apparatus 126 includes an absolute value detector 142 that generates a positive signal equal to the absolute magnitude of the amplified error signal and a voltage controlled oscillator 144 that generates a series of positive pulses at a rate which is substantially proportional to the voltage generated by the absolute value detector 142. The positive pulses, or one bits, generated by the voltage controlled oscillator 144 are applied to the other inputs of the first and second NOR gates 136 and 140. Accordingly, when the voltage controlled oscillator 144 output is at zero volts is applies a zero bit to the first and second NOR gates 136 and 140. It thus follows that the first and second NOR gates 136 and 140 generate a zero bit output signal whenever the voltage controlled oscillator 144 generates a one bit when the voltage controlled oscillator 144 generates a zero bit either the first or the second NOR gate 136 or 140 will generate a one bit, which is then amplified by either a first or second amplifier 146 or 148. Amplified pulses from the first amplifier 146 are passed through a set of normally closed contacts 150 and a normally closed limit switch 152 to the first input terminal 110 of the translator 30 and amplified signals from the second amplifier 148 are transmitted through a second normally closed limit switch 154 to the second input terminal 112 of the translator 30 so as to operate the translator 30 in the aforedescribed fashion.

The limit detector network 34 in the throttle control system is provided for preventing the selected reference signal from exceeding a predetermined level. The limit network detector 34 includes a potentiometer 160, across which the selected reference signal is applied by the reference signal generating network 20, and an SCR 162 having its gate electrode connected to the wiper of the potentiometer 160. The SCR 162 is in series with an AC relay 164 that is connected to the AC voltage supply 105 through a set of normally closed contacts 166. The limit detector network 34 also includes a capacitor 168 connected in parallel with the AC relay 164 for preventing chatter of the contacts it controls, as will soon be described in a complete operational description.

The automatic throttle release network 36 is provided for monitoring each of the feedback signals generated by the feedback signal generating network 22 and for automatically causing the throttle 14 to be returned to the predetermined throttle setting to which is is biased by the spring 16. The automatic throttle release network 36 includes several isolation diodes 170 through 172 for preventing feedback from the automatic throttle release network 36 to the feedback signal generating network 22. The cathodes of the diodes 170 through 172 are each connected to a potentiometer 174, the wiper 175 of which is connected to the gate terminal of an SCR 176. The SCR 176 is connected in series with a current limiting resistor 178, a DC relay 180, and a set of normally closed contacts 182 that are connected to a positive DC potential source. Accordingly, when one of the feedback signals generated by the feedback signal generating network 22 exceeds a predetermined value, as established by the setting of the wipers 68 through 70 of the potentiometers 65 through 67 and by the wiper 175 of the potentiometer 174, the voltage at the gate of the SCR 176 is sufficient to turn on the SCR 176 and cause energization of the DC relay 180. When the DC relay 180 is energized it closes a set of normally open contacts 184 so as to apply a large positive signal from the potentiometer 41 through a lead 186 to the output of the lead network 114. The magnitude of the positive signal is selected sufficiently large so as to cause the return of the throttle 14 to the predetermined setting determined by the spring 16, which setting is the minimum throttle setting and causes the engine to merely idle. Another set of normally open contacts 188 are in parallel with the normally open contacts 184 for allowing the operator to selectively return the throttle 14 to the predetermined position by closing the pushbutton switch 83 in a manner which will be apparent in the following operational description.

OPERATIONAL DESCRIPTION

When the throttle control system 18 is placed in operation the pushbutton switch 83 in the logic network 24 may be momentarily closed to assure readiness of the system 18. Upon closure of the pushbutton switch 83 the signal on the output terminal E becomes a one bit, which causes the generation of zero bits on the other output terminals A through D and causes the AC relay 99 to become energized. Since all of the inputs to the NOR gate 78 are zero bits, a one bit remains on the output terminal E indefinitely. Accordingly, the relay 99 is kept energized and the SCR 94 conductive. Energization of the relay 99 closes the contacts 188 so as to apply the large positive signal to the lead network 114 output. The positive pulse causes application of several pulses to the second input terminal 112. The translator 30 thus causes the stepping motor 32 to release the throttle 14 until the limit switch 154 is opened. The limit switch 154 is located to be opened when the stepping motor 32 has fully released the throttle 14.

In addition, energization of the relay 99 opens the normally closed contacts 166 in the limit detector network 34 and opens the normally closed contacts 182 in the automatic throttle release network 36 as operation of these networks is not needed.

If the operator of the throttle control system 18 wishes to control the engine speed of the vehicle 10 he may do so by momentarily closing the pushbutton switch 79. When the switch 79 is closed it places the system 18 in the engine speed control mode by applying a one bit to the output terminal A. Since the output terminal A is connected to an input of the NOR gate 78, the one bit on the output terminal A changes the signal on the output terminal E to a zero bit. The zero bit on the output terminal E allows the SCR 94 to become nonconductive, and deenergizes the relay 99, so as to open the contacts 188 and closes the contacts 166 and 182.

The one bit on the output terminal A also causes energization of the AC relay 95, which closes the normally open contacts 48 and 71 in the respective reference and feedback signal generating networks 20 and 22. When the contacts 48 and 71 are closed the throttle control system is locked in the engine speed control mode and the operator may vary the engine speed of the vehicle 10 by adjusting the wiper arm 44 of the potentiometer 38 in the reference signal generating network 20.

When the reference signal generated is greater than the feedback signal the differential amplifier 26 generates a positive error signal, which is amplified to become a negative error signal by the lead network 114. This negative amplified error signal when applied to the zero detector 128 and the absolute value detector apparatus 126 causes the first NOR gate 136 to generate a train of zero and one bits at a rate determined by the absolute value detector apparatus 126. Each of these one bits when amplified and applied to the translator 30 cause the translator 30 to apply certain control signals to the stepping motor 32 so as to increase the throttle 14 setting by the predetermined amount. When the error signal is reduced to zero by the reference and feedback signals being equal no digital signals are applied to the translator 30 so the control signals which it supplies to the stepping motor 32 are merely sufficient to hold the throttle 14 setting constant against the bias force of the spring 16. However, should the vehicle 10 engine speed exceed the desired speed indicated by the potentiometer 38 setting, the selected feedback signal exceeds the selected reference signal and the resulting positive amplified error signal at the output of the lead network 114 causes a second digital signal to be applied to the second input terminal 112 of the translator 30, which then causes the stepping motor 32 to release the throttle 14 until the actual engine speed corresponds to the desired engine speed.

Should the operator of the throttle control system 18 wish to linearly increase the engine speed of the vehicle 10 he may do so by leaving the potentiometer 38 at a constant setting and closing the pushbutton switch 82 momentarily. When the pushbutton switch 82 is momentarily closed it applies a one bit to the output terminal D so as to effect energization of the AC relay 98, but does not affect the NOR gates 74 through 76. Upon energization of the AC relay 98 the normally closed contacts 52 in the reference signal generating network 20 are opened and the normally opened contacts 54, which are also in the reference signal generating network 20, are closed. The voltage at the wiper 44 of the potentiometer 38 is thus applied to the input terminal of the integrator 56. Since this voltage is constant the voltage generated by the integrator 56 on the lead 53 increases at a uniform rate and this selected reference signal is compared with the engine speed feedback signal on the lead 58 in the manner just described so as to uniformly increase the engine speed of the vehicle 10.

When the vehicle 10 engine speed exceeds a certain level that is predetermined by the potentiometer 160 setting in the reference signal generating network 20 the voltage on the gate of the SCR 162 causes the SCR 162 to conduct, effecting energization of the AC relay 164. Upon energization of the AC relay 164 the normally closed contacts 150 in the signal conditioning network 28 are opened so as to prevent subsequent application of the first digital signal to the translator 30. Since the SCR 162 latches the AC relay 164 in an energized condition, the stepping motor 32 is prevented from subsequently increasing the throttle 14 setting until the pushbutton switch 83 has been depressed, which opens the normally closed contacts 166 in the limit detector network 34. This same result may be achieved by placing the first limit switch 152 in a location where it is opened by moving the throttle 14 to a certain throttle setting through engine speed may vary considerably while the throttle 14 is held constant.

The automatic throttle release network 36 provides a function somewhat similar to that of the limit detector network 34 as it monitors each of the feedback signals generated by the feedback signal generating network 22 so that when any of them exceed a predetermined value the SCR 176 is latched in a conductive condition. This effects energization of the DC relay 180, which closes the contacts 184 so as to apply the large positive signal through the lead 186 to the output terminal of the lead network 114. The positive signal causes the signal conditioning network 28 to apply the second digital signal to the second input terminal 112 of the translator 30 so as to reverse the stepping motor 32 and release the throttle 14 until the second limit switch 154 is open.

When it is desired to discontinue controlling the vehicle 10 engine speed the pushbutton switch 83 is momentarily closed by the throttle control system 18 operator to apply a one bit to the output terminal E. The one bit on the output terminal E, when applied to an input of any of the NOR gates 74 through 77, causes the respective output terminals A through D to contain a zero bit. Where the vehicle 10 engine speed has previously been controlled as in this description, the relays 95 and 98 are deenergized when the pushbutton switch 83 is closed. Upon deenergization of the relay 95 the contacts 48 and 71 in the reference and feedback signal generating networks 20 and 22 are opened so as to prevent subsequent application of reference and feedback signals to the differential aplifier 26. Upon deenergization of the relay 98 the contacts 52 and 54 are also returned to their normal condition so as to render inoperative the integrator 56. In addition, the one bit on the terminal E energizes the relay 99, which closes the contacts 188 so as to apply the large positive potential to the signal conditioning network 28 and cause the stepping motor 32 to release the throttle 14.

In the alternative, the system 18 operator may control the torque developed by the engine of the vehicle 10 by closing the pushbutton switch 80. This would energize the relay 96, close the contacts 49 and 72 to apply engine torque reference and feedback signals to the differential amplifier 26, and preclude simultaneous energization of the relays 95 and 97 through the NOR gate interconnections. The operator could thus control the engine torque developed by manipulation of the potentiometer 39 setting. He could also uniformly increase the engine torque developed by closing the pushbutton 82 to activate the integrator 56. The system 18 operates in the engine torque control mode in the manner just described regarding the engine speed control mode.

Similarly, the vehicle 10 speed may be controlled upon closure of the pushbutton switch 81. Upon closure of the pushbutton switch 81, the system 18 automatically switches to the vehicle speed control mode in a fashion similar to that just described regarding operation in the engine torque control mode.

It is thus apparent that the apparatus herein described permits selectively controlling any of several vehicle operating conditions within prescribed limits. While this description has been directed toward the illustrated embodiment various modifications may be made to this apparatus without departing from the spirit of this invention.

Having thus described my invention what I claim is:

1. In a motor vehicle having a throttle that is normally biased to a certain throttle setting, apparatus for controlling the vehicle operation by manipulating the throttle in a manner which selectively increases the throttle setting and returns the throttle to the certain throttle setting comprising, in combination, reference signal generating means for generating a plurality of analog reference signals that are each indicative of a certain desired operating condition of the vehicle; feedback signal generating means for generating a plurality of analog feedback signals that are each actually indicative of a certain operation condition of the vehicle corresponding to one of the reference signals; a differential amplifier having differential input terminals and an output terminal on which it generates an error signal corresponding to the difference between the signals supplied to the input terminals; first selectively operable means for selectively applying a certain reference signal to one of the amplifier input terminals and the corresponding feedback signal to the other of the input terminals, thereby causing the error signal to be indicative of the difference between the reference and feedback signals related to a certain operating condition of the vehicle; second selectively operable means for causing said reference signal generating means to increase the certain reference signal at a predetermined rate; a reversible stepping motor that is drivably coupled to the throttle for increasing and decreasing the throttle setting a predetermined amount in response to certain control signals; a translator connected to the stepping motor for generating the certain control signals, one of the certain control signals causing the stepping motor to increase the throttle setting by a certain amount and another of the certain control signals causing the stepping motor to decrease the throttle setting by a certain amount; signal conditioning means including an amplifier having a variable amplification factor for amplifying the error signal by an amount determined by the rate at which the error signal changes, digital signal generating means for generating first and second digital signals indicative of the polarity and magnitude of the amplified error signal, and means for controlling the generation of the certain control signals by the translator by applying said first and second digital signals to the translator; said first digital signal and said other control signal in response to said second digital signal; and means responsive to said certain reference signal for preventing the application of said first digital signal to the translator when the certain reference signal exceeds a certain value so as to prevent the stepping motor from subsequently increasing the throttle setting.

2. In a motor vehicle having a throttle that is normally biased to a certain throttle setting, apparatus for controlling the vehicle operation by manipulating the throttle in a manner which selectively increases the throttle setting and returns the throttle to the certain throttle setting comprising, in combination, means for generating at least one analog reference signal indicative of a certain desired operating condition of the vehicle; means for generating at least one analog feedback signal actually indicative of a certain vehicle operating condition corresponding to one of the reference signals; a differential amplifier having differential input terminals and an output terminal on which is generated an error signal corresponding to the difference between the signals supplied to the input terminals; selectively operable means for selectively applying a certain reference signal to one of the amplifier input terminals and the corresponding feedback signal to the other of the input terminals, thereby causing the error signal generated by the amplifier to be indicative of the difference between reference and feedback signals related to a certain operating condition of the vehicle; second selectively operable means for causing said reference signal means to increase the certain reference signal at a predetermined rate; a reversible stepping motor that is drivably coupled to the throttle for increasing and decreasing the throttle setting a predetermined amount in response to certain control signals; a translator connected to the stepping motor for generating the certain control signals, one of the certain control signals causing the stepping motor to increase the throttle setting by a certain amount and another of the certain control signals causing the stepping motor to decrease the throttle setting by a certain amount; signal conditioning means responsive to the error signal for controlling the generation of the certain control signals by the translator whereby the translator generates said one control signal when the certain reference signal is greater than the corresponding feedback signal and generates said other control signal when the certain reference signal is less than the corresponding feedback signal, the signal conditioning means controlling the generation of the certain control signals by the translator by applying first and second digital signals to the translator, which generates said one control signal in response to said first digital signal and said other control signal in response to said second digital signal; means responsive to the certain reference signal for preventing the application of said first digital signal to the translator when the certain reference signal exceeds a certain value so as to prevent the stepping motor from subsequently increasing the throttle setting; and means responsive to each of the feedback signals for causing the signal conditioning means to apply said second digital signal to the translator regardless of the error signal whenever one of the feedback signals exceeds a predetermined value, the translator thereby effecting a return of the throttle to the certain throttle setting by applying said other control signal to the stepping motor whenever one of the feedback signals exceeds the predetermined value.

* * * * *